(12) United States Patent
Thomsen et al.

(10) Patent No.: US 9,058,371 B2
(45) Date of Patent: Jun. 16, 2015

(54) DISTRIBUTED DATABASE LOG RECOVERY

(75) Inventors: Dirk Thomsen, Heidelberg (DE); Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 16 days.

(21) Appl. No.: 13/290,742

(22) Filed: Nov. 7, 2011

(65) Prior Publication Data

US 2013/0117237 A1 May 9, 2013

(51) Int. Cl.
*G06F 7/00* (2006.01)
*G06F 17/30* (2006.01)
*G06F 11/14* (2006.01)

(52) U.S. Cl.
CPC .... *G06F 17/30575* (2013.01); *G06F 17/30377* (2013.01); *G06F 11/1474* (2013.01); *G06F 2201/84* (2013.01)

(58) Field of Classification Search
USPC .............................. 707/999.101, 999.102, 715
See application file for complete search history.

(56) References Cited

U.S. PATENT DOCUMENTS

| | | | | |
|---|---|---|---|---|
| 6,968,335 | B2 * | 11/2005 | Bayliss et al. | 1/1 |
| 7,831,574 | B2 * | 11/2010 | Pareek et al. | 707/703 |
| 2004/0098372 | A1 * | 5/2004 | Bayliss et al. | 707/3 |
| 2004/0148289 | A1 * | 7/2004 | Bamford et al. | 707/10 |
| 2007/0185938 | A1 * | 8/2007 | Prahlad et al. | 707/204 |
| 2007/0299885 | A1 * | 12/2007 | Pareek et al. | 707/202 |
| 2008/0270363 | A1 * | 10/2008 | Hunt et al. | 707/3 |
| 2010/0191884 | A1 * | 7/2010 | Holenstein et al. | 710/200 |
| 2012/0011098 | A1 * | 1/2012 | Yamada | 707/623 |
| 2012/0109895 | A1 * | 5/2012 | Zwilling et al. | 707/648 |
| 2012/0303576 | A1 * | 11/2012 | Calder et al. | 707/611 |

* cited by examiner

*Primary Examiner* — Hosain Alam
*Assistant Examiner* — Eliyah S Harper
(74) *Attorney, Agent, or Firm* — Mintz Levin Cohn Ferris Glovsky and Popeo, P.C.

(57) ABSTRACT

Log entries are recorded in a data storage application (such as an in-memory database, etc.) for a plurality of transactions among nodes in a node hierarchy. The node hierarchy comprises master node having a plurality of slave nodes. Thereafter, at least a portion of the master node log entries are replayed until a first replay position is reached. Next, for each slave node, at least a portion of its respective log entries are replayed until the first replay position is reached (or an error occurs). Subsequently, replay of at least a portion of the log entries of the master node that are subsequent to the first replay position is initiated by the master node in parallel to at least a portion of the replaying by the slave nodes. Related apparatus, systems, techniques and articles are also described.

39 Claims, 4 Drawing Sheets

DISTRIBUTED DATABASE LOG RECOVERY

TECHNICAL FIELD

The subject matter described herein relates to techniques for recovering data using a log in a distributed database.

BACKGROUND

In a database system, backups during online operation are typical arranged so that there are occasional full backups in combination with continuous (redo) log backups. During data recovery, a full backup will be imported first and afterwards the (redo) log applied. With some distributed database systems having a plurality of nodes, a log can be stored across multiple nodes (i.e., servers, etc.). With such an arrangement, a full backup can be transactionally-consistent over all nodes, however, log backup cannot always be synchronized due to performance reasons. As the whole system needs to reach one common (transactionally-consistent) point in time after data recovery, the log applied on the different servers need to be synchronized. Further, the log should be read only once to optimize performance, which is especially important if the backup is read from a tertiary media, such as a tape.

SUMMARY

In one aspect, log entries are recorded in a data storage application (such as an in-memory database, etc.) for a plurality of transactions among nodes in a node hierarchy. The node hierarchy comprises master node having a plurality of slave nodes. Thereafter, at least a portion of the master node log entries are replayed until a first replay position is reached. Next, for each slave node, at least a portion of its respective log entries are replayed until the first replay position is reached (or an error occurs). Subsequently, replay of at least a portion of the log entries of the master node that are subsequent to the first replay position is initiated by the master node in parallel to at least a portion of the replaying by the slave nodes.

In some implementations, there at least two master nodes with each having corresponding slave nodes. In such cases, the first replay position can differ for at least two of the master nodes.

A snapshot of a local persistency for the master node can be performed after replay to the first replay position. Similarly, a snapshot of a local persistency for each slave node after replay to the first replay position. One or both of these snapshots can be performed using shadow-paging techniques.

The slave nodes can replay their log entries to reach a transactionally-consistent state with the master node. In some cases replay of at least one of the slave nodes can be stopped if a problem occurs during replay. Problems include, for example, a corrupt or missing log. A maximum recoverable position can, in such a situation, report a maximum recoverable position prior to the first replay position to the master node. The master node persistency can then be reset to the maximum recoverable replay position and the master node can instructing each slave node to reset its persistency to the maximum recoverable replay position. The master node can add/use a filter that prevents replay by the slave nodes beyond the maximum recoverable replay position. In addition, log entries stored at the master node and the corresponding slave nodes beyond the maximum recoverable replay position can be discarded.

Articles of manufacture are also described that comprise computer executable instructions permanently stored on non-transitory computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, operations specified by methods can be implemented by one or more data processors either within a single computing system or distributed among two or more computing systems.

The subject matter described herein provides many advantages. For example, the current subject matter enables replay of large portions of a log with few synchronization points between involved nodes/servers. In addition, only small parts of the log needs to be replayed twice in cases of errors.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
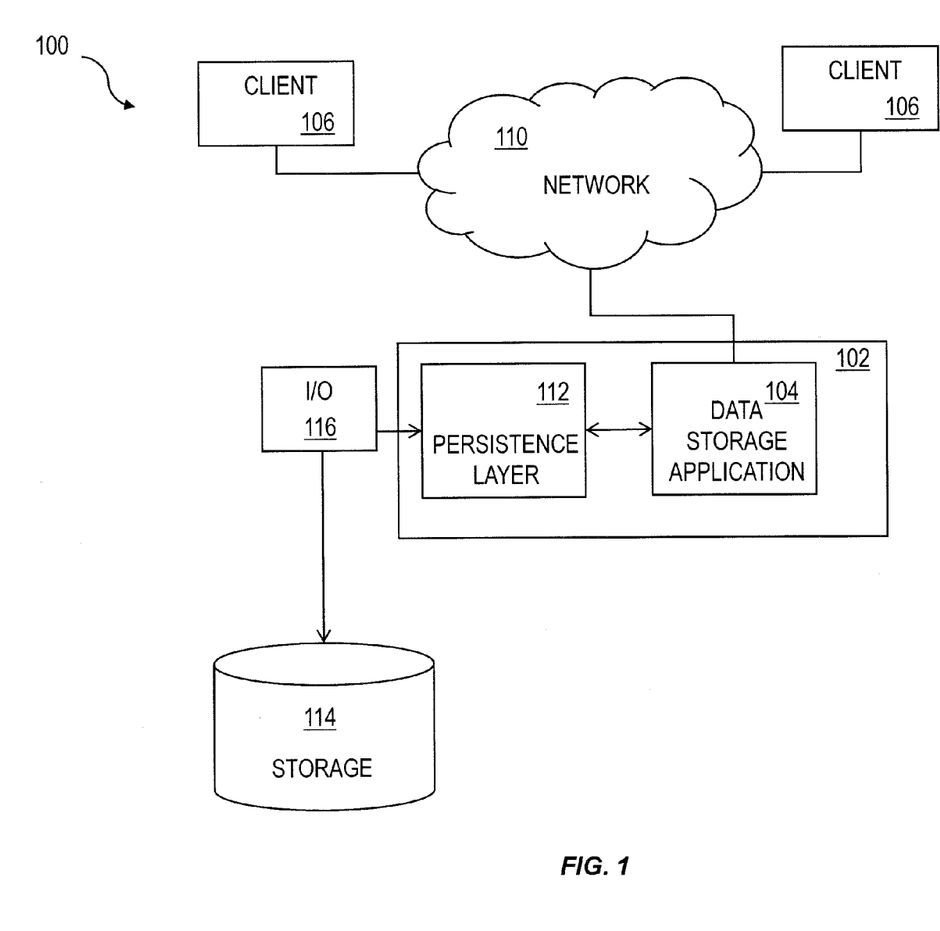
FIG. 1 is a diagram illustrating a system including a data storage application.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 2:
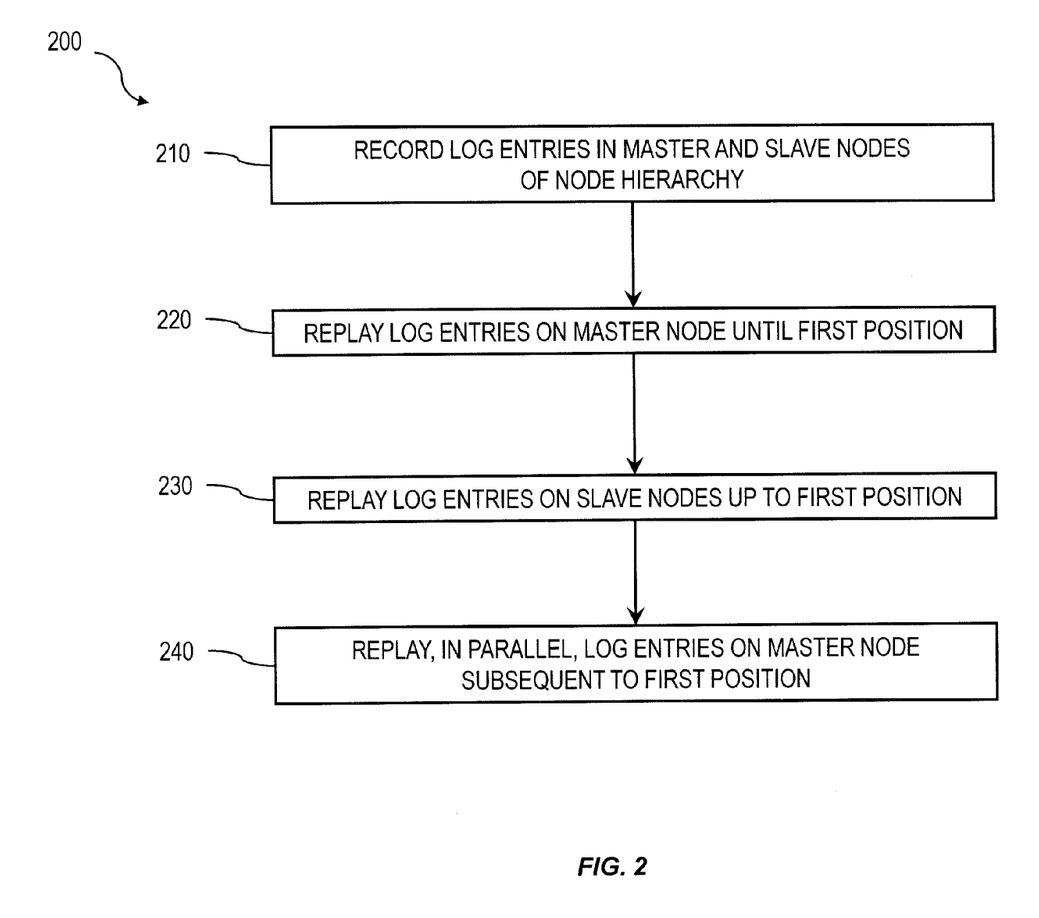
FIG. 2 is a process flow diagram illustrating a technique for data recovery using a log distributed over numerous nodes of a distributed data storage application.

FIG. 2 is a process flow diagram 200 in which, at 210, log entries for a plurality of transactions are recorded among nodes of a data storage application that are in a node hierarchy. The node hierarchy includes a master node having a plurality of slave nodes. Thereafter, at 220, the master node replays at least a portion of its log entries until a first replay position is reached. At this point, at 230, each slave node replays at least a portion of its respective log entries until the first replay position is reached. In addition, at 240, the master node can initiate, in parallel to at least a portion of the replaying by the slave nodes, replay of at least a portion of its log entries subsequent to the first replay position.

Figure 3:
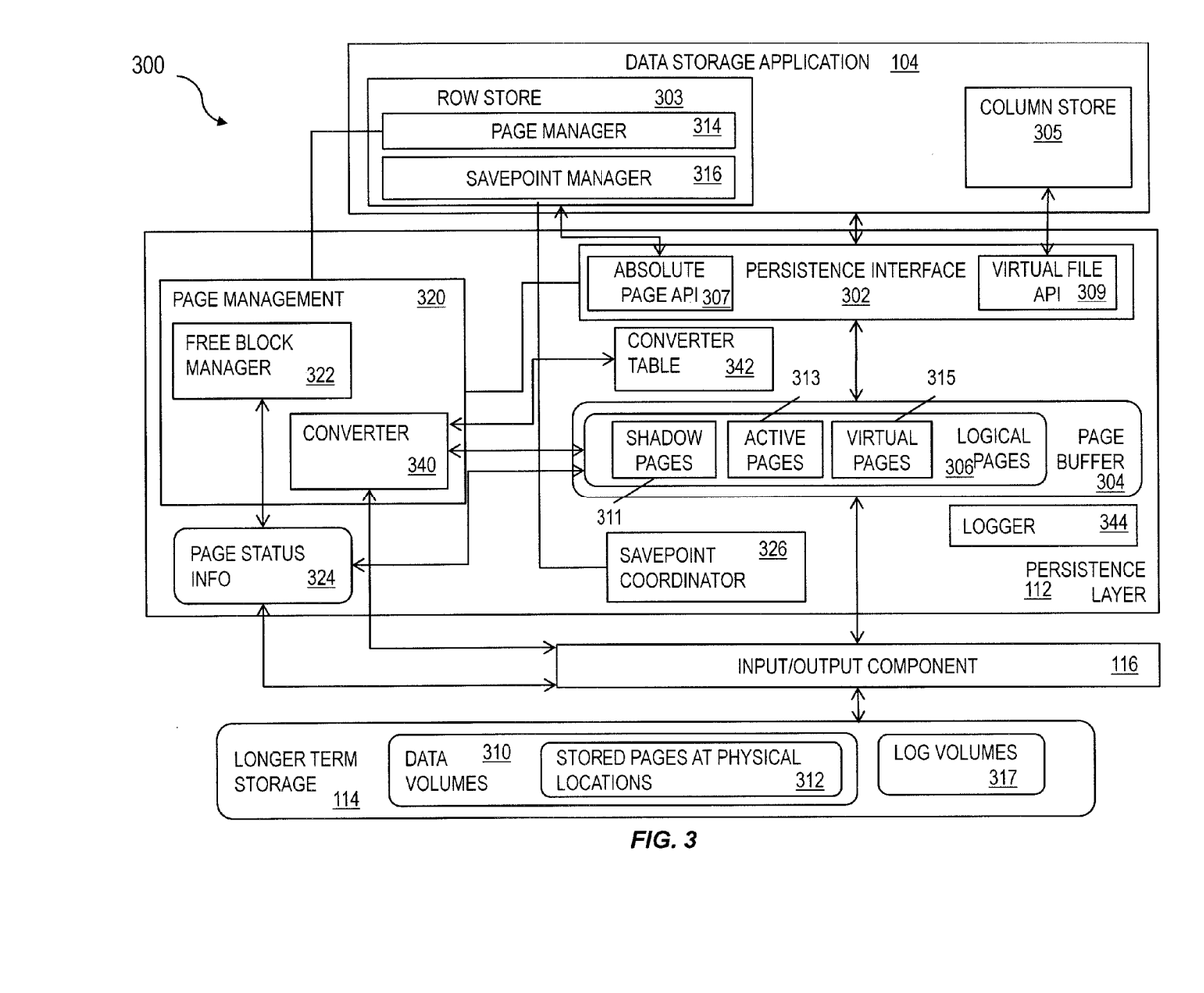
FIG. 3 is a diagram illustrating details of the system of FIG. 1.

FIG. 3 shows a software architecture 300 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 302. A page buffer 304 within the persistence layer 112 can store one or more logical pages 306, and optionally can include shadow pages 311, active pages 313, data pages of virtual files 315 and the like. The logical pages 306 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 310 where stored pages 312 are allocated at physical memory blocks.

In some implementations, the data storage application 104 can include a row store 303 and a column store 305. The row store 303 can comprise or be otherwise in communication with a page manager 314 and/or a savepoint manager 316. The page manager 314 can communicate with a page management module 320 at the persistence layer 112 that can include a free block manager 322 that monitors page status information 324, for example the status of physical pages within the storage 114 and logical pages in the persistence layer 112 (and optionally in the page buffer 304). The savepoint manager 316 can communicate with a savepoint coordinator 326 at the persistence layer 204 to handle savepoints, which are used to create a consistent persistent state of the database for restart after a possible crash. The row store 303 can access the persistence interface 302 via an absolute page API 307. The column store 305 which can store columns in contiguous memory can access the persistence interface 302 via a virtual file API 309.

In some implementations of a data storage application 104, the page management module of the persistence layer 112 can implement shadow paging. The free block manager 322 within the page management module 320 can maintain the status of physical pages. The page buffer 304 can included a fixed page status buffer that operates as discussed herein. A converter component 340, which can be part of or in communication with the page management module 320, can be responsible for mapping between logical and physical pages written to the storage 114. The converter 340 can maintain the current mapping of logical pages to the corresponding physical pages in a converter table 342. The converter 340 can maintain a current mapping of logical pages 306 to the corresponding physical pages in one or more converter tables 342. When a logical page 306 is read from storage 114, the storage page to be loaded can be looked up from the one or more converter tables 342 using the converter 340. When a logical page is written to storage 114 the first time after a savepoint, a new free physical page is assigned to the logical page. The free block manager 322 marks the new physical page as "used" and the new mapping is stored in the one or more converter tables 342.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component 344 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 344 whenever a change is made. This information can be written to disk at latest when the transaction ends. The log entries can be persisted in separate log volumes 317 while normal data is written to data volumes 310. With a redo log, committed changes can be restored even if the corresponding data pages were not written to disk. For undoing uncommitted changes, the persistence layer 112 can use a combination of undo log entries (from one or more logs) and shadow paging.

The persistence interface 302 can handle read and write requests of stores (e.g., in-memory stores, etc.). The persistence interface 302 can also provide write methods for writing data both with logging and without logging. If the logged write operations are used, the persistence interface 302 invokes the logger 344. In addition, the logger 344 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 344. For an entry of type "update", for example, this would be the identification of the affected record and the after image of the modified data.

When the data application 104 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 344 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

The column store 305 can persist its tables to virtual files provided by the persistence layer 112 via the virtual file API 307. Internally the persistence layer 112 can map a virtual file to a chain of linked pages 315 stored in the page buffer 304. Data belonging to one columnar table can be stored in multiple virtual files: one virtual file per column for a main storage and one virtual file for a delta log. In addition, one virtual file can optionally be stored per column for the main storage of the history part of the table, and/or one virtual file can optionally be stored per table for the delta of the history part of the table. The persistence layer 112 can maintain a directory that stores for each virtual file the start page and additional information such as the size and the type of the virtual file.

Figure 4:
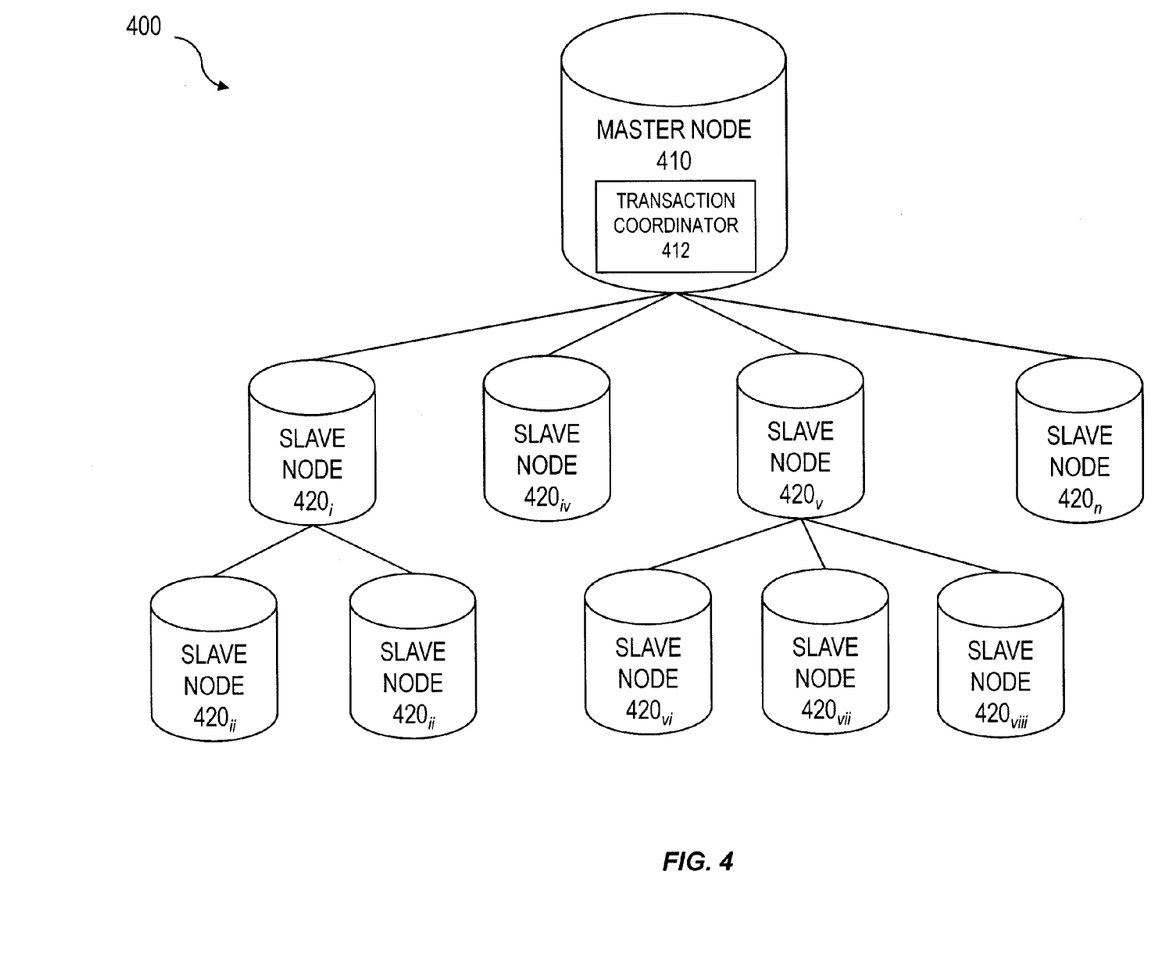
FIG. 4 is a logic diagram illustrating a master node and several slave nodes.

As stated above, the data storage application 104 can comprise, with reference to the diagram 400 of FIG. 4, a distributed database system in which there are a plurality of nodes—with at least one of the nodes being a master node 410 having corresponding slave nodes $420_{i\ldots n}$ (FIG. 4 shows a single master node 410 for illustrative purposes—it will be appreciated that there can be more than one master node 410 in some implementations). The data storage application can use a two-phase commit protocol for data recovery purposes. The master node 410 can include a transaction coordinator 412 that can store respective prepare commit positions of each slave node $420_{i\ldots n}$ in a commit log record. With this arrangement, the overall log is distributed amongst separate logs generated at each of the nodes 410, $420_{i\ldots n}$ which need to be reconstructed during replay.

In order to effect replay using the distributed log (i.e., logs across multiple nodes which are later integrated/assembled, etc.), the master node 410 must be replayed prior to the slave nodes $420_{i\ldots n}$. In particular, the master node 410 will replay a first part of its log—which can be dictated by log positions or time.

After master node 410 replayed its first part, it will perform a snapshot of it local persistency (using, for example, a shadow-page technique as described above). The last commit log record replayed on the master node 410 contains positions of respective prepare commit log records, until which the slave nodes $420_{i\ldots n}$ must replay their respective logs to come to a transactionally-consistent state with the master node 410. The master node 410 can then trigger all slave nodes $420_{i\ldots n}$ to perform the replay up to their corresponding log positions. In parallel, the master node 410 can start processing the next part of its log (i.e., a portion of the log sequentially after the first part of the log). The other slave nodes $420_{i\ldots n}$ can be triggered to do log replay will replay their respective log until their respective positions specified by the master node 410. After this is done, each slave node $420_{i\ldots n}$ can trigger a snapshot of its local persistency and when finished, reports that it is finished to the master node 410. This process can be repeated until any of the slave nodes $420_{i\ldots n}$ reach an end of their respective log or an error arises in their respective log.

If one of the slave nodes $420_{i\ldots n}$ faces a problem during log replay (corrupt or missing log or other problem during log replay), it can stop replay and report the maximum recoverable position (i.e., the maximum point in the respective log) to the master node 410. In this situation, the master node 410 can determine respective snapshots for each slave node $420_{i\ldots n}$ in the system, which were taken before triggering replay of the problematic log record.

Then, the master node 410 can resets its persistency to the latest recoverable snapshot and asks all other slave nodes $420_{i\ldots n}$ reset their respective persistencies to their respective snapshots before the maximum recoverable position. Afterwards, the process restarts from this snapshot, but the master node 410 can add a filter/generate an instruction not to replay any commit log record which would require the failed slave node $420_{i\ldots n}$ to replay past the erroneous position. After this position is reached, the master node 410 can again determine respective slave positions from a last replayed commit log record and request all slave nodes $420_{i\ldots n}$ to replay the log until their respective positions. After this is done, the rest of the log can be thrown away, because it is not replayable anymore. The system is then in a transactionally-consistent state and can be started.

During the replay, several (as opposed to only one slave node $420_{i\ldots n}$) may report an error or an error can be reported by a slave node $420_{i\ldots n}$ during at some other point (e.g., the final step described above, etc.). In either case, these can errors can be accounted for by adding further filters for the commit log record in the log of the master node 410 and restarting from the appropriate snapshot.

If the master node 410 reaches end of its log, the logs on all of the slave nodes $420_{i\ldots n}$ are replayed to be implicitly transactionally-consistent with the log of the master node 410. Any remaining log on the slave nodes $420_{i\ldots n}$ are dropped, because it cannot be replayed.

As will be appreciated, the above described stepped recovery avoids replaying entire log twice. Once to determine a last possible replayable position during a first recovery, which will, with high probability, run into an error; and once to recover from the error and actually replay up to last transactionally-consistent point in time.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A non-transitory computer program product storing instructions that, when executed by at least one programmable processor, cause the at least one programmable processor to perform operations comprising:

recording, in a data storage application, log entries for a plurality of transactions among nodes in a node hierarchy, the node hierarchy comprising a master node comprising a transaction coordinator and having a plurality of slave nodes, each slave node having a separate log at which its respective log entries are stored, the transaction coordinator storing respective prepare commit positions of each slave node in a commit record;

replaying, prior to replay of log entries at the slave nodes, at least a portion of the master node log entries until a first replay position is reached, the first replay position comprising positions of respective commit log records at the slave nodes until which the slave nodes must replay their respective logs in order to come to a transactionally-consistent state with the master node;

replaying, for each slave node and in response to at least one trigger from the master node, at least a portion of its respective log entries until the corresponding slave node reaches an end of its respective log prior to the first replay position;

initiating, by the transaction coordinator of the master node in parallel to at least a portion of the replaying by the slave nodes prior to the first replay position, replay of at least a portion of its log entries subsequent to the first replay position; and discarding all log entries stored beyond the first replay position.

2. A computer program product as in claim 1, wherein the node hierarchy comprises at least two master nodes, each having corresponding slave nodes, and wherein the first replay position differs for at least two of the master nodes.

3. A computer program product as in claim 1, wherein the operations further comprise: performing a snapshot of a local persistency for the master node after replay to the first replay position.

4. A computer program product as in claim 3, wherein the snapshot is performed using shadow-paging.

5. A computer program product as in claim 1, wherein the operations further comprise: performing a snapshot of a local persistency for each slave node after replay to the first replay position.

6. A computer program product as in claim 5, wherein the snapshot of the local persistency is performed using shadow-paging.

7. A computer program product as in claim 1, wherein:
the slave nodes replay their log entries to reach a transactionally-consistent state with the master node;
the data storage application is implemented on a distributed database system that includes the master node and the plurality of slave nodes; and
the replaying on the master node and the plurality of slave nodes occurs on the distributed database system.

8. A computer program product as in claim 1, wherein the data storage application comprises an in-memory database.

9. A computer program product as in claim 1, wherein the operations further comprise: stopping, by at least one of the slave nodes, replay prior to the first replay position if a problem occurs during replay.

10. A computer program product as in claim 9, wherein the problem comprises a corrupt or missing log.

11. A computer program product as in claim 9, wherein the operations further comprise: reporting, by the stopped at least one of the slave nodes, a maximum recoverable replay position prior to the first replay position to the master node.

12. A computer program product as in claim 11, wherein the operations further comprise: resetting the master node persistency to the maximum recoverable replay position.

13. A computer program product as in claim 12, wherein the operations further comprise: instructing each slave node by the master node to reset its persistency to the maximum recoverable replay position.

14. A computer program product as in claim 13, wherein the operations further comprise: adding a filter by the master node preventing replay by the slave nodes beyond the maximum recoverable replay position.

15. A computer program product as in claim 14, wherein the operations further comprise: discarding log entries stored at the master node and the corresponding slave nodes beyond the maximum recoverable replay position.

16. A method comprising:
recording, in a data storage application, log entries for a plurality of transactions among nodes in a node hierarchy, the node hierarchy comprising at least one master node comprising a transaction coordinator and having a plurality of slave nodes, the transaction coordinator coordinating replay among the plurality of slave nodes, each slave node having a separate log at which its respective log entries are stored, the transaction coordinator storing respective prepare commit positions of each slave node in a commit record;
replaying, for each master node and prior to replay of log entries at the slave nodes, at least a portion of its log entries until a first replay position is reached, the first replay position comprising positions of respective commit log records at the slave nodes until which the slave nodes must replay their respective logs in order to come to a transactionally-consistent state with the master node;
performing, for each master node, a snapshot of a local persistency for the master node;
replaying, for each slave node of a corresponding master node and in response to at least one trigger from the corresponding master node, at least a portion of its respective log entries until a maximum recoverable position prior to the first replay position is reached on one of the slave nodes, the maximum recoverable position representing a latest transactionally-consistent state and being specified by a last commit log record replayed by each corresponding master node;
performing a snapshot of a local persistency for each slave node after replay to the maximum recoverable position;
replaying the log entries on the at least one master node and the corresponding slave nodes to the maximum recoverable position, wherein the at least one master node replays log entries at a point in time subsequent to a point in time at which the corresponding slave nodes are replaying log entries; and
discarding all log entries stored beyond the maximum recoverable position.

17. A method as in claim 16, wherein the snapshots are performed using shadow-paging.

18. A system comprising:
at least one data processor; and
memory coupled to the at least one data processor, the memory storing instructions to cause the at least one data processor to perform operations comprising:
recording, in a data storage application, log entries for a plurality of transactions among nodes in a node hierarchy, the node hierarchy comprising at least one master node comprising a transaction coordinator and having a plurality of slave nodes, the transaction coordinator coordinating replay among the plurality of slave nodes, each slave node having a separate log at which its respective log entries are stored, the transaction coordinator storing respective prepare commit positions of each slave node in a commit record;
replaying, for each master node and prior to replay of log entries at the slave nodes, at least a portion of its log entries until a first replay position is reached, the first replay position comprising positions of respective commit log records at the slave nodes until which the slave nodes must replay their respective logs in order to come to a transactionally-consistent state with the master node;
replaying, for each slave node of a corresponding master node and in response to at least one trigger from the corresponding master node, at least a portion of its respective log entries until a maximum recoverable position prior to the first replay position is reached on one of the slave nodes, the maximum recoverable position representing a latest transactionally-consistent state;
replaying, in parallel, the log entries on the at least one master node and the corresponding slave nodes to the maximum recoverable position, wherein the at least one master node replays log entries at a point in time subsequent to a point in time at which the corresponding slave nodes are replaying log entries; and
discarding all log entries stored beyond the maximum recoverable position.

19. A system as in claim 18, wherein the operations further comprise:
performing a snapshot of a local persistency for the master node after replay to the first replay position; and
performing a snapshot of a local persistency for each slave node after replay to the first replay position.

20. A system as in claim 18, wherein the node hierarchy comprises at least two master nodes, each having corresponding slave nodes, and wherein the first replay position differs for at least two of the master nodes.

21. A system as in claim 19, wherein the snapshots are performed using shadow-paging.

22. A system as in claim 18, wherein:
the slave nodes replay their log entries to reach a transactionally-consistent state with the master node;
the data storage application is implemented on a distributed database system that includes the master node and the plurality of slave nodes; and
the replaying on the master node and the plurality of slave nodes occurs on the distributed database system.

23. A system as in claim 18, wherein the data storage application comprises an in-memory database.

24. A system as in claim 18, wherein the operations further comprise: stopping, by at least one of the slave nodes, replay prior to the first replay position if a problem occurs during replay.

25. A system as in claim 24, wherein the problem comprises a corrupt or missing log.

26. A system as in claim 25, wherein the operations further comprise: reporting, by the stopped at least one of the slave nodes, a maximum recoverable replay position prior to the first replay position to the master node.

27. A system as in claim 26, wherein the operations further comprise: resetting the master node persistency to the maximum recoverable replay position.

28. A system as in claim 27, wherein the operations further comprise: instructing each slave node by the master node to reset its persistency to the maximum recoverable replay position.

29. A system as in claim 28, wherein the operations further comprise: adding a filter by the master node preventing replay by the slave nodes beyond the maximum recoverable replay position.

30. A system as in claim 29, wherein the operations further comprise: discarding log entries stored at the master node and the corresponding slave nodes beyond the maximum recoverable replay position.

31. A method as in claim 16, wherein:
the data storage application is implemented on a distributed database system that includes the master node and the plurality of slave nodes; and
the replaying on the master node and the plurality of slave nodes occurs on the distributed database system.

32. A method as in claim 31, wherein the data storage application comprises an in-memory database.

33. A method as in claim 16 further comprising: stopping, by at least one of the slave nodes, replay prior to the first replay position if a problem occurs during replay.

34. A method as in claim 33, wherein the problem comprises a corrupt or missing log.

35. A method as in claim 33 further comprising: reporting, by the stopped at least one of the slave nodes, a maximum recoverable replay position prior to the first replay position to the master node.

36. A method as in claim 35 further comprising: resetting the master node persistency to the maximum recoverable replay position.

37. A method as in claim 36 further comprising: instructing each slave node by the master node to reset its persistency to the maximum recoverable replay position.

38. A method as in claim 37 further comprising: adding a filter by the master node preventing replay by the slave nodes beyond the maximum recoverable replay position.

39. A method as in claim 38 further comprising: discarding log entries stored at the master node and the corresponding slave nodes beyond the maximum recoverable replay position.

* * * * *